I
US 6,729,191 B1

(12) United States Patent
Fonteneau

(10) Patent No.: US 6,729,191 B1
(45) Date of Patent: May 4, 2004

(54) ELECTRICAL INDUCTIVE FLOWMETER CIRCUITS INCLUDING COIL EXCITORS AND CURRENT REGULATORS

(75) Inventor: Norman O. Fonteneau, Acushnet, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/561,766

(22) Filed: Apr. 28, 2000

(51) Int. Cl.$^7$ ................................................. G01F 1/60
(52) U.S. Cl. ..................................................... 73/861.28
(58) Field of Search ............................. 73/861, 861.02, 73/861.08, 861.11, 861.13, 861.16, 861.17

(56) References Cited

U.S. PATENT DOCUMENTS

| 3,783,686 A | 1/1974 | Hentschel ............... 73/194 EM |
| 4,117,721 A | 10/1978 | Suzuki et al. .................. 73/194 |
| 4,137,766 A | 2/1979 | Handel ......................... 73/194 |
| 4,339,958 A | * 7/1982 | Shauger ................... 73/861.17 |
| 5,018,391 A | 5/1991 | Doll ......................... 73/861.17 |
| 5,351,554 A | 10/1994 | Budmiger ................. 73/861.17 |
| 5,621,319 A | * 4/1997 | Bilotti et al. ................ 324/251 |
| 5,641,914 A | 6/1997 | Doll ......................... 73/861.17 |
| 5,808,208 A | 9/1998 | Doll ......................... 73/861.17 |

* cited by examiner

Primary Examiner—Harshad Patel
(74) Attorney, Agent, or Firm—Kevin A. Oliver; Foley Hoag LLP

(57) ABSTRACT

An inductive flowmeter for measuring the flow velocity of a conductive fluid has an electrical circuit that advantageously utilizes minimal analog components, and hence has advantages over conventional systems. The circuit has an evaluation channel that measures a differential voltage induced across the fluid as it flows through a region having a magnetic field, and has a reference channel that provides a voltage indicative of the strength of the magnetic field. The differential voltage and the reference voltage are each digitized over the same time interval, and a programmable controller calculates a ratio of the digitized voltages to provide the flow velocity of the fluid.

16 Claims, 3 Drawing Sheets

US 6,729,191 B1

ELECTRICAL INDUCTIVE FLOWMETER CIRCUITS INCLUDING COIL EXCITORS AND CURRENT REGULATORS

BACKGROUND OF THE INVENTION

The present invention relates to magnetic flow meters for measuring flow velocity of a conductive fluid. More particularly, the invention provides an improved inductive-type magnetic flow meter.

Magnetic flow meters typically include a conduit, such as a tube, through which a conductive fluid, whose flow velocity is to be measured, flows. A field generator, such as an electromagnetic coil, generates a magnetic field within a portion of the fluid flow and directed transverse to the direction of the flow. Such flow meters further include a pair of electrodes selectively spaced apart relative to the direction of the fluid and the direction of the applied magnetic field. The passage of the fluid through the magnetic field induces a voltage, i.e., a potential difference, between the paired electrodes. This voltage is proportional to the strength of the applied magnetic field, to the flow velocity of the fluid, and the separation of the electrodes. This typical magnetic flow meter further includes an evaluation circuit that measures the strength of the applied magnetic field and the induced voltage at the electrodes, to provide the flow velocity of the fluid.

Early magnetic flow meters employed alternating current (AC) for generating an AC magnetic field within the fluid. In these flow meters, the field generator, e.g., a coil, was typically directly connected to an AC power supply, operating, for example, at 220V/50 Hz. Such AC flow meters suffered from susceptibility to zero drift and from considerable reactive power consumption.

Subsequent introduction of pulsed DC magnetic flow meters solved some disadvantages of AC flow meters. In pulsed DC flow meters, pulses of DC current excite a coil, which in turn generates pulses of magnetic field within the fluid. Although pulsed DC flow meters have low power consumption and good zero stability, they are typically not adequate for high noise applications. In particular, the excitation current in these flow meters is typically small, resulting in small magnetic fields and hence low signal amplitudes, e.g., low magnitude of the induced voltage between the electrodes.

U.S. Pat. Nos. 5,641,914 and 5,808,208, the disclosures of which are incorporated herein by this reference, describe a pulsed DC magnetic flow meter with relatively high coil excitation current. The disclosed flow meter employs numerous analog components, which render the construction of the flow meter cumbersome and degrade its performance characteristics.

Accordingly, it is an object of the present invention to provide an improved inductive-type flow meter.

SUMMARY OF THE INVENTION

This invention provides an electrical inductive flow meter circuit for evaluating flow velocity of a conductive flowing fluid. The electrical circuit of the invention includes an evaluation channel for measuring a voltage induced in the flowing fluid as the fluid passes a region having a pulsed magnetic field. The magnetic field, which is directed transverse to the direction of fluid flow, induces the voltage across the fluid in a direction transverse to both the field direction and the direction of the fluid flow. The circuit has a reference channel for providing a reference voltage indicative of the amplitude of the pulsed magnetic field.

The electrical circuit of the invention includes a pair of analog-to-digital converters (ADC) that are active concurrently during at least selected intervals of a measurement cycle. A measurement cycle is selected to include at least the duration of the pulsed magnetic field. One ADC is connected to the evaluation channel to receive the value of the induced voltage. The other ADC is connected to the reference channel to receive the value of the reference voltage. A programmable controller, such as a micro-controller, activates the converters during selected intervals of a measurement cycle so that the converters receive, concurrent, and preferably simultaneous, values of the induced voltage and of the reference voltage, and digitize them.

The programmable controller employs a stable clock for timing the measurement cycle. In particular, the controller activates the converters concurrently during selected intervals of the measurement cycle, and receives the digital values of the induced voltage and the reference voltage that the converters provide. The controller employs these values to calculate the flow velocity of the fluid.

In one aspect, the electrical flow-meter circuit includes a coil for generating the magnetic field in the flow region of the fluid. A coil excitor energizes the coil with a succession of direct current (DC) pulses of selected duration and repetition, to generate the pulsed magnetic field.

One preferred embodiment of the invention employs a pair of electrodes spaced apart transverse to the flow direction and transverse to the magnetic field for producing electrical signals indicative of the voltage induced across the flowing fluid. The evaluation channel receives the electrical signals at the electrodes, and can include two integrating amplifiers, each connected to one electrode to amplify these signals. The evaluation channel can further include a differential amplifier which receives the output signals of the two integrating amplifiers, to provide an induced voltage proportional to a difference between the signals induced at the electrodes.

A third integrating amplifier receives the induced voltage and, in response, applies an amplified voltage to one analog-to-digital converter during an active interval, to produce a digitized voltage differential. One preferred embodiment of the circuit optionally includes a reference circuit that imposes a reference voltage, preferably selected to be substantially zero, at the input of the third integrating amplifier at the beginning of each measurement cycle, to reduce DC drift from a previous measurement cycle.

The reference circuit can include a voltage summer which receives the induced voltage at one input and is connected at its output to an input of the third integrating amplifier. The reference circuit further includes an integrating circuit connected between the output of the third integrating amplifier and another input of the summer. The integrating circuit is preferably configured to have a relatively long time constant, illustratively four seconds in one embodiment, to ensure that the momentary closure of the switch S1 results in substantially zeroing the DC offset voltage accumulated at the input of the amplifier 34 from a previous measurement cycle.

According to a further aspect of the invention, the reference channel includes a current sensor that is connected to a coil that generates the magnetic field. The sensor measures the current through the coil and provides the measured value of the current to an integrating amplifier. The integrating amplifier provides a reference voltage that is indicative of the measured current, and is hence indicative of the strength of the magnetic field. One of the analog-to-digital converters receives this reference voltage during an active interval, and provides a digitized value of the reference voltage to the programmable controller.

In one preferred embodiment of the circuit of the invention, a current regulator is connected to the coil exciter and stabilizes the DC current pulse that generates the pulsed magnetic field, thereby stabilizing the magnitude of the magnetic field. This stabilization advantageously improves the signal-to-noise ratio of the measured induced voltage differential, thereby resulting in a more accurate measurement of the flow velocity of the fluid.

An illustrative embodiment of the invention is described below with reference to the following drawings.

ILLUSTRATED EMBODIMENT

Inductive-type flow-meters operate based on Faraday's law of electromagnetic induction. In particular, in such flow meters, the passage of a conductive fluid through a magnetic field directed transverse to the direction of the fluid flow induces a potential difference across the fluid. The voltage magnitude is proportional to the flow velocity of the fluid. The magnitude of this induced voltage is also proportional to the strength of the applied magnetic field. Hence, measurements of the applied magnetic field strength and of the induced voltage can provide the flow velocity of the fluid.

The present invention provides an electrical circuit for creating the requisite magnetic field in an inductive-type flow-meter, and for measuring the magnitudes of the induced voltages and the applied magnetic field, with minimal analog components, to evaluate the flow velocity of the fluid.

Figure 1:
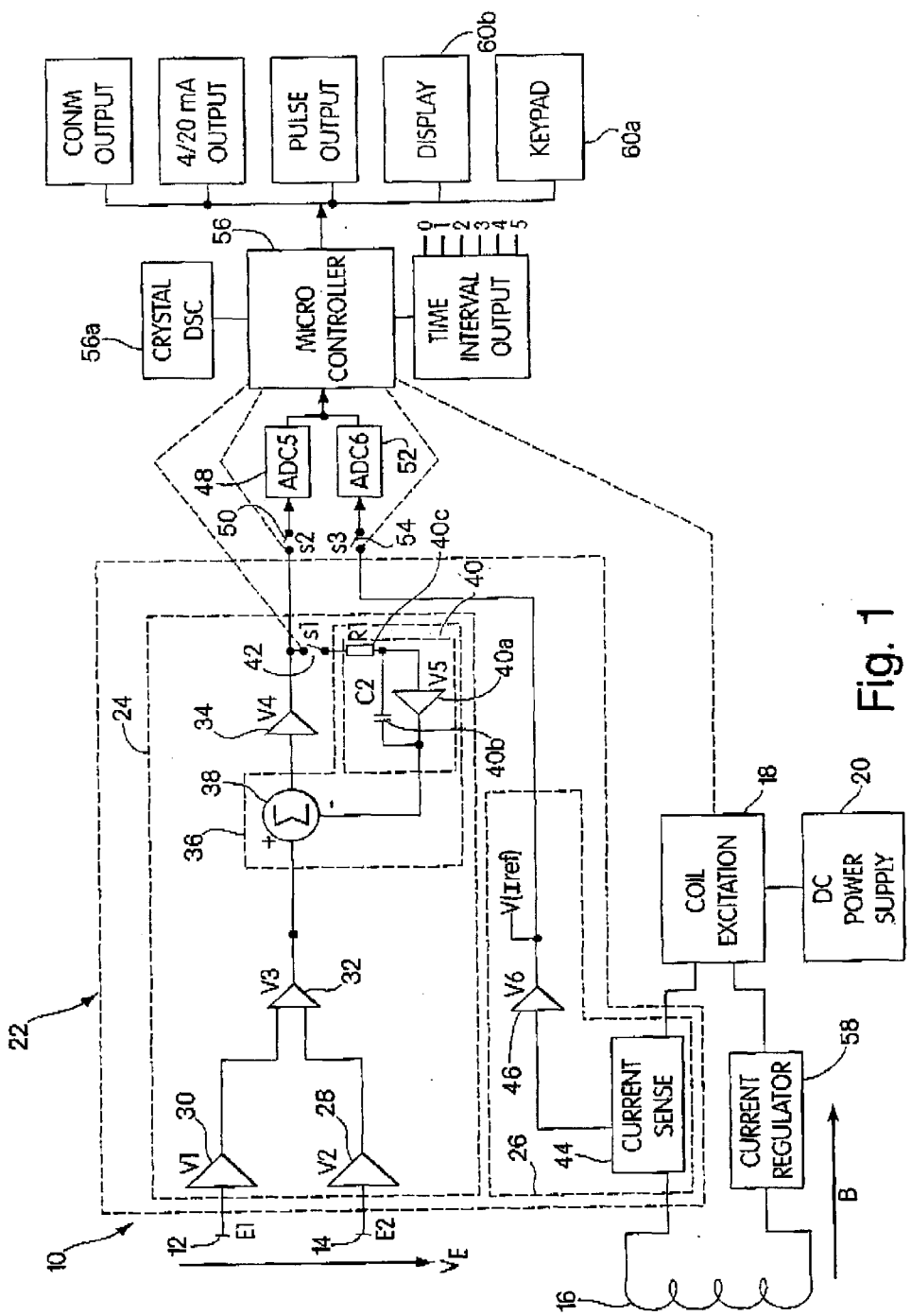
FIG. 1 is a circuit diagram of a flow meter according to teachings of the invention, for measuring the flow velocity of a conductive fluid.

FIG. 1 shows an electrical circuit 10 of an inductive-type flow meter according to the invention for evaluating the flow velocity of a conductive fluid. The flow-meter circuit 10 includes two electrodes 12 and 14 positioned in ohmic contact with the flowing fluid (not shown) and spaced apart transverse to both the direction of the fluid flow and the direction of a magnetic field B. Further, the electrical circuit 10 includes a electromagnetic coil 16 connected to a coil excitation stage 18 that energizes the coil 16, to create the magnetic field. The coil excitation stage 18 receives electrical power from a direct current power supply 20, and directs current pulses having selected amplitudes and selected durations through the coil 16, to generate a pulsed magnetic field within a region of the fluid. The passage of the flowing fluid through the region having the magnetic field induces a voltage between the electrodes 12 and 14, i.e. across the fluid in a direction transverse to both the direction of the magnetic field and the direction of fluid flow. The vector $V_E$ in FIG. 1 designates this induced electrode voltage.

The electrical circuit 10 has an evaluation module 22 that includes an evaluation channel 24 and a reference channel 26. The evaluation channel 24 measures the voltage induced across the fluid to provide an electrode voltage $V_{electrode}$, that is proportional to the induced voltage. The reference channel 26 provides a reference voltage $V_{ref}$ that is proportional to the magnitude of the current through the coil 16, and is hence indicative of the strength of the applied magnetic field.

Figure 2A:
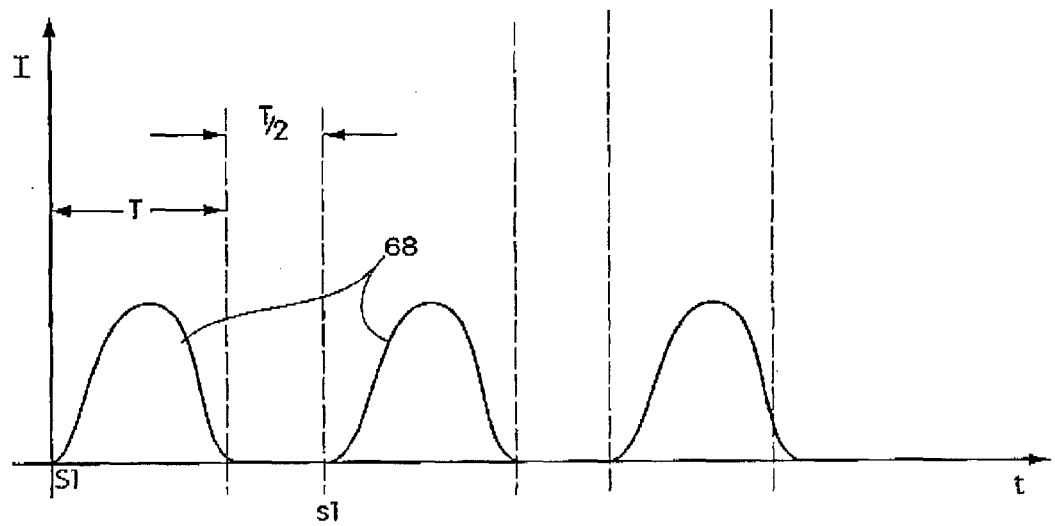
FIG. 2A is a plot of current through the excitation coil as function of time and schematically shows the application of a series of DC pulses to the coil of the circuit of FIG. 1.

FIG. 2A shows a waveform 68 depicting the amplitude of a current (I) in the coil 16 as a function of time (t), as the coil excitation stage 18 applies a series of DC current pulses to the coil 16. The waveform 68 illustrates that a current pulse through the coil 16 has a duration T. In this illustrative example, each current pulse is separated in time from an adjoining pulse, i.e., an immediately preceding or following pulse, by a time interval that is half of the duration of a pulse, i.e., T/2. The time interval T is preferably an integer multiple of the period of the power line frequency. The duration of the integer is selected, among other factors, based on the desired signal magnitude, which increases with the duration.

Figure 2B:
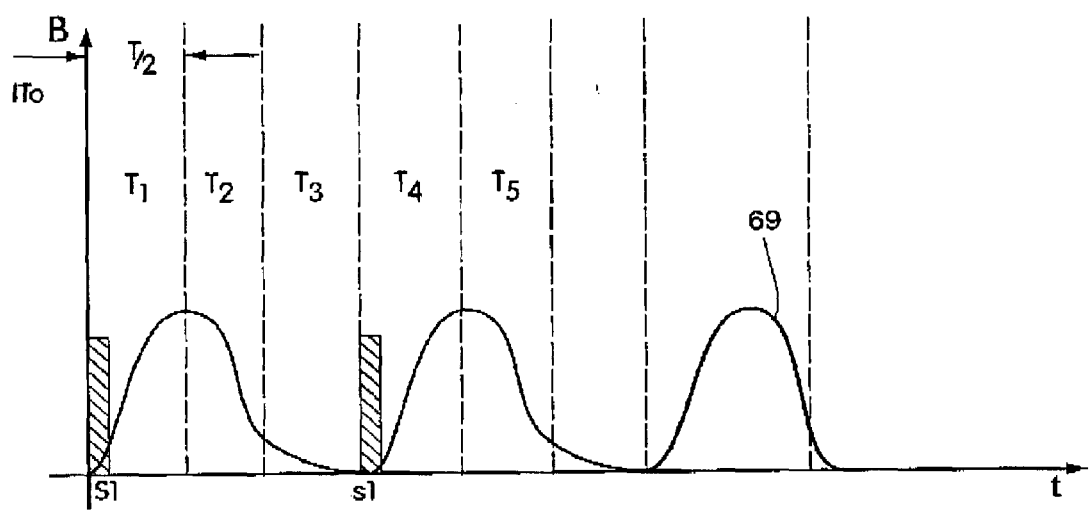
FIG. 2B is a plot of magnetic field strength as a function of time and schematically shows the timing of a measurement cycle relative to DC pulses applied to the coil of the circuit of FIG. 1.

FIG. 2B illustrates schematically the strength of a magnetic field (B), designated with waveform 69, generated in the coil 16 as a function of time (t), as a result of the application of the succession of current pulses shown in FIG. 2A. In this illustrative example, one measurement cycle is defined as the time periods designated as $T_0$ to $T_5$. One measurement cycle hence includes the durations of two current pulses, and includes the three time intervals corresponding to time delays between two successive current pulses.

Referring again to FIG. 1, the illustrated evaluation channel 24 includes a pair of integrating amplifiers 28 and 30 that receive and amplify the signals induced at the electrodes 12 and 14, respectively, as a result of the passage of the flowing fluid. A differential amplifier 32 receives the outputs of the integrating amplifiers 28 and 30 at its two input terminals, and produces an output proportional to a difference between the signals induced at the electrodes 12 and 14. A further integrating amplifier 34 receives this differential voltage and produces in response an amplified differential voltage $V_{electrode}$.

The evaluation channel 24 of FIG. 1 further includes a reference circuit 36 that imposes a reference voltage, preferably selected to be substantially zero, at the input of the integrating amplifier 34 at selected times during a measurement cycle, as described below. The reference circuit 36 includes an electrical summer 38 that is connected at one input terminal to the output of the differential amplifier 32, and is connected at its other input terminal to the output of an integrating circuit 40. The integrating circuit 40 includes an operational amplifier 40a connected electrically in parallel with a capacitor 40b, and further includes a resistor 40c connected in series with the combination of the amplifier 40a and the capacitor 40b. A switch 42 connects the integrating circuit 36 to the output of the integrating amplifier 34. When the switch 42 is closed, the integrating circuit 36 integrates the output of the integrating amplifier 34 and provides an integrated signal to the summer 38. The summer 38 subtracts this integrated signal from the output of the differential amplifier 32 to provide a reference signal. A preferred practice of the invention selects the values of the capacitor 40b and of the resistor 40c in a manner known in the art such that the time constant of the integrating circuit 36, in combination with the duration of the closure of the switch 42, results in a reference voltage that is substantially zero. Hence, the reference circuit advantageously diminishes, at the input of the integrating amplifier 34, any DC drift accumulated since the previous closure of the switch 42.

The illustrated reference channel 26 includes a current sensor 44, connected to the coil 16, which measures instantaneous values of the current in the coil 16. A number of current sensors are known in the art. In a preferred embodiment of the invention, the current sensor is a value, precision resistor. An amplifier 46 receives the output of the current sensor 44 and provides an output voltage $V_{ref}$, that is indicative of the value of the current through the coil 16, and is hence indicative of the strength of the applied magnetic field.

An integrating analog-to-digital converter 48 is connected to the output of the evaluation channel 24, by way of a switch 50. The converter 48 receives the electrode voltage, $V_{electrode}$, when the switch 50 is closed, and digitizes it. A second integrating analog-to-digital converter 52 is connected to the reference channel 26 via a second switch 54. The converter 52 receives the reference voltage, $V_{ref}$, when the switch 54 is closed, to provide a digitized $V_{ref}$ value. A programmable controller 56, such as a micro-controller, receives and calculates a ratio of the digitized values of the two voltages, $V_{electrode}$ and $V_{ref}$. This ratio is proportional to the flow velocity of the fluid. In addition, the controller 56 includes a stable clock, such as a crystal oscillator 56a, for timing the measurement cycle. The controller 56 employs the stable clock to initiate the closure and opening of the switches 42, 50, and 54 at selected times during the measurement cycle, as described below.

The illustrated flow-meter circuit 10 can optionally include a number of peripheral components, such as a keypad 60a and a display unit 60b. An operator can, by way of example, enter parameter values and program the controller by way of the keypad 60a, and can display the measured value of flow velocity on the display unit 60b. The three output peripheral components shown on the right in FIG. 1 provide different output formats, as known in the art.

Typical operation of the circuit 10 is described below with reference to the measurement cycle depicted in FIG. 2B. (Those skilled in the art will understand that other measurement cycles can be selected. Further, the controller 56 can be programmed to open and close the switches 42, 50, and 54 at times other than those described in the illustrative example that follows.) The controller 56 controls the timing of a measurement cycle, which, with reference to FIG. 2B, illustratively includes five time intervals, designated T0 to T5. At the beginning of the excitation intervals T1 and T4, the switch 42 is closed momentarily, typically for example for 20 msec, under the control of the controller 56. Upon closure of the switch 42, the integrating circuit 40 integrates the output voltage of the amplifier 34 to provide an integrated output voltage. The voltage summer 38 receives the integrated output voltage from the integrating circuit 40a as one input and receives the output of the differential amplifier 32 as another input, and subtracts these two voltages, thus substantially zeroing the input voltage of the amplifier 34. Thus, the momentary closure of the switch 42 advantageously diminishes any DC drift voltage accumulated at the input of the integrating amplifier 34 during a previous excitation interval.

The controller 56 controls the coil exciter 18 to apply DC pulses to the coil 16 at selected times during the measurement cycle. With reference to FIGS. 1 and 2B, in this illustrative example, the coil exciter 18, under the control of the controller 56, applies two successive DC pulses to the coil 16 during a measurement cycle. One DC pulse spans the time periods T1 and T2, and the other DC pulse spans the time periods T4 and T5. The controller 56 simultaneously closes the switches 50 and 54 throughout the measurement cycle, i.e., through the time interval T0–T5, to allow simultaneous acquisition of data corresponding to Vref and Velectrode by the analog-to-digital converters 48 and 52, respectively. This simultaneous acquisition of data, corresponding to the reference and the differential voltages, advantageously diminishes errors in calculating the ratio of these voltages. Such errors could otherwise occur, for example, as a result of changes in Vref during the measurement cycle.

The acquisition of data by the digital-to-analog converters 48 and 52 during the time interval $T_0$–$T_5$ corresponds effectively to two distinct measurements. One measurement corresponds to the time interval $T_1$ plus $T_2$, and the other corresponds to the time interval $T_4$ plus $T_5$, i.e., the time intervals corresponding to application of DC pulses to the coil 16. Each such measurement provides both the $V_{electrode}$ and $V_{ref}$ values over the same time interval. This aspect of invention is advantageous over prior circuits that do not provide simultaneous measurement of both a reference voltage and a differential voltage, particularly during every excitation pulse. In contrast, the illustrated circuit 10 measures both $V_{electrode}$ and $V_{ref}$ simultaneously, and during the time intervals $T_1+T_2$ and again during the intervals $T_4+T_5$, thereby increasing the accuracy of the evaluated flow velocity.

A number of integrating analog-to-digital conversion techniques are known in the art, and can be utilized in practicing the present invention. Some of these techniques include dual slope, voltage to frequency (V/F), and sigma-delta conversions. The choice of a particular analog-to-digital technique to be employed in the illustrated circuit 10 can be made with known skills depending on a number of factors, such as the required system resolution, acquisition time, dynamic range, and the desired degree of noise rejection.

The controller 56 receives the digital output signals from the converters 48 and 52, corresponding to the digitized values of $V_{electrode}$ and $V_{ref}$, respectively, and calculates a ratio of the digitized values. As discussed above, this ratio is proportional to the flow velocity of the fluid in the flowmeter. Thus, the circuit 10 provides the flow velocity of the fluid.

With continuing reference to FIG. 1, the illustrated flow-meter circuit 10 includes a current regulator 58 connected in series with the coil 16, to stabilize the amplitudes of DC pulses applied to the coil 16. The regulator 58 can be of the linear type or the switching type, although a switching regulator is often deemed preferable. Prior art metering systems which primarily employ analog techniques can create a wide dynamic input signal range by providing a number of selectable gain settings and an algorithm which allows selecting the correct gain setting based on the operating conditions at startup. Such analog circuitry with its associated gain settings is complex, and requires a relatively time-consuming design process and relatively complex testing. In addition, each gain setting can require a separate calibration, further rendering the manufacture of the circuit costly and time-consuming. In contrast, the metering circuit 10 with the current regulator 58 advantageously reduces the dynamic range of the electrode and reference signals, i.e., $V_{ref}$ and $V_{electrode}$, and hence provides advantages over conventional systems.

The illustrated flow-meter circuit 10 employs relatively few analog components. This provides a number of advantages over evaluation circuits employed in conventional flow meters. In particular, such conventional evaluation circuits contain many analog components, which are typically susceptible to a change in characteristics as a function of time, i.e., they exhibit drift. Such drifts of analog components introduces errors, unless corrected with periodic re-calibration of the flowmeter. Further, the characteristics of such analog components change with temperature, which adversely affects circuit stability. In addition, analog components are susceptible to noise pick-up from external influences such as voltage surges and stray electromagnetic fields.

In contrast, the evaluation circuit of the invention employs considerably fewer analog components than conventional evaluation circuits, thereby providing enhanced reliability. Further, by employing digital components in the evaluation circuit, the invention attains improved repeatability of the measurement of flow velocity. The digital circuit of the invention is programmable, thus readily permitting changing characteristics of the circuit, such as timing of a measurement cycle. In contrast, changing an analog circuit typically requires costly and time-consuming changes of analog components and/or of circuit topology.

Figure 3:
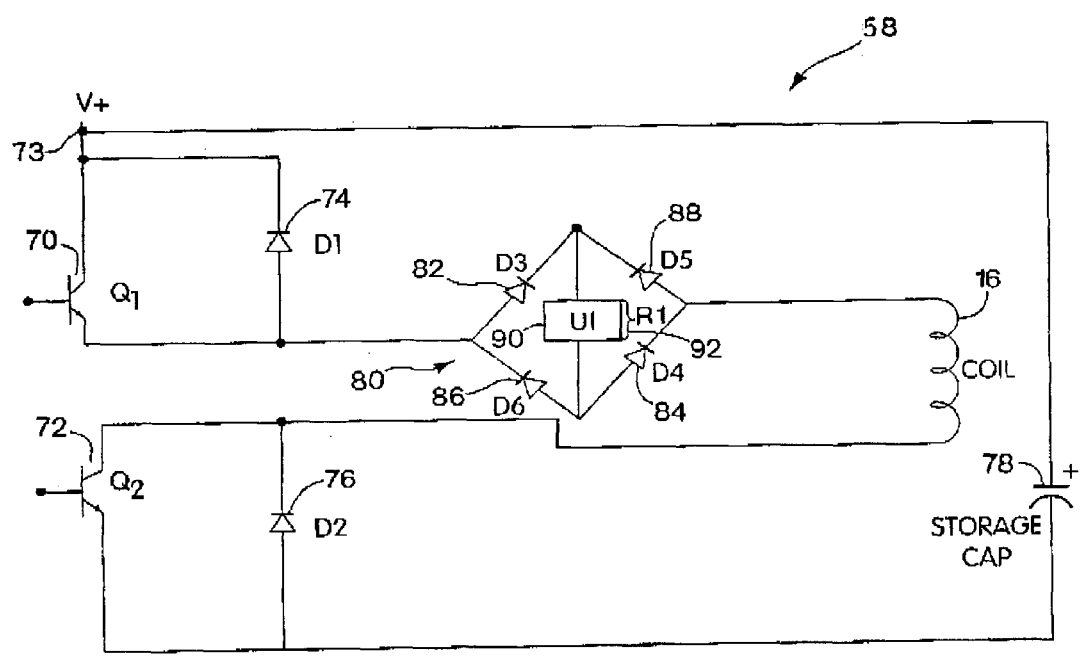
FIG. 3 is a schematic diagram of a coil excitation and current regulation circuit according to the invention.

FIG. 3 shows one embodiment of the coil excitation 18 and current regulator 58 for exciting the coil 16 of FIG. 1. The illustrated excitation and regulator circuit has a pair of power switching transistors 70, 72 in a half bridge circuit and connected to receive DC voltage at a terminal 73, as from the DC power supply 20 of FIG. 1. Each of a pair of diodes 74 and 76 is arranged with the forward conduction path and in parallel with and in an opposition to the forward conduction path through one transistor 70 and 72, as shown. The coil 16 of FIG. 1 is connected to be in series between the forward conduction paths of the two transistors 70 and 72 and, for current in the opposite direction, in series between the forward conduction paths of the diodes 74 and 76.

The illustrated circuit of FIG. 3 further includes a storage capacitor 78 connected between the DC input terminal 73 and a common return. The storage capacitor 78 is hence connected in parallel with the series path of the transistors 70 and 72 and the coil 16 and the series path of the diodes 74 and 76 and the coil 16.

A current regulation stage 80 of the circuit of FIG. 3 is connected in series with one side of the coil 16 and includes a four-diode bridge circuit with diodes 82, 84, 86, and 88. An integrated three-terminal regulator 90, having an external adjustment resistor 92, is connected across the bridge terminals that are not connected to either the coil or the switching elements 70–76. The integrated three-terminal regulator can, by way of example, be an LM317 integrated circuit device.

The combined excitation/current regulation circuit of FIG. 3 operates in response to control signals which the microcontroller 56 (FIG. 2) applies to the base input terminals of the transistors 70 and 72. The control signals switch the transistors 70 and 72 ON and OFF in tandem, i.e. ON to conduct current concurrently, and OFF to be nonconductive concurrently. When the transistors 70 and 72 are switched ON, they conduct current in response to the supply voltage applied to the terminal 73, and in response to energy stored in capacitor 78, in a series path that successively includes the transistor 70, the regulator diodes 82 and 84 by way of the integrated regulator 90, the coil 16, and the transistor 72. The resultant current in the coil 16 produces a desired magnetic field for measurement as discussed above. When the transistors 70 and 72 are switched OFF, the magnetic field of the coil 16 collapses, which produces current that successively threads from the coil 16 through regulator diodes 88 and 86 by way of the integrated regulator 90, diode 74, the storage capacitor 78, and diode 76.

The circuit hence stores in the capacitor 78 energy from the magnetic field produced by the coil 16. The circuit of FIG. 3 thus delivers high power pulses of energy to the coil 16 at the command of the microcontroller 56. Further, it stores a high percentage of that energy, when the transistors are nonconducting, in the capacitor 78 and transfers that stored capacitive energy to the magnetic field energy produced by the coil 16 during the next transistor conduction interval. The current regulator 80 in the circuit maintains a desired linear relationship of the current being switched between the coil and the capacitor, to attain an optimal magnetic field strength and avoid magnetic saturation in the coil 16.

The circuit of FIG. 3 produces high current pulses in the coil 16, which result in high measured-signal strength for the circuit of FIG. 1, and the energy in the magnetic field is recovered for use in subsequent current pulses by storage in the capacitor 78. The circuit of FIG. 3 thus has minimal energy loss in transferring energy from storage in the capacitor 78 to the magnetic field produced by the coil 16.

The linear current regulation stage 80 in the FIG. 3 circuit employs a readily available integrated three-terminal regulator 90. The regulation stage, as discussed above, is connected in a full-wave bridge of rectifiers and in series with the current in the coil 16. Note that the current in the integrated regulator 90, by virtue of the full-wave bridge rectifier, always has the same direction. The invention can equally be practiced with a switching current regulator, as is known in the art.

It will thus be seen that the invention attains the objectives set forth above. The embodiments of the invention are intended to be interpreted as illustrative and not in a limiting sense. Numerous variations and modifications to the above embodiments will be apparent to those skilled in the art, without departing from the scope of the invention.

Having described the invention, what is claimed as new and secured by Letters Patent is:

1. An electrical inductive flow-meter circuit for evaluating flow velocity of a flowing fluid, the flow-meter circuit comprising:

a coil for generating a magnetic field in a flow region of the fluid, said magnetic field having a direction transverse to a direction of the fluid flow, and a coil excitor for energizing said coil with a DC current pulse having a selected duration to generate said magnetic field, a current regulator connected to said coil excitor to stabilize said DC current pulse, and an evaluation module for measuring a pair of voltages induced in said fluid during said duration of the magnetic field and for measuring said current to obtain the flow velocity of the fluid, wherein the coil excitor and the current regulator include:
   first and second transistors connected to opposite sides of the coil, such that the coil is connected in series between the forward conduction paths of the transistors, first and second diodes connected to the respective first and second transistors and to opposite sides of the coil, such that the forward conduction paths of the first and second diodes are arranged in opposition to the forward conduction paths of the first and second transistors, and such that the coil is connected in series between the forward conduction paths of the diodes, and a storage capacitor connected in parallel with the series path of the first and second transistors and in parallel with the series path of the first and second diodes.

2. The electrical circuit of claim 1, wherein the evaluation module includes:

an evaluation channel for measuring a differential voltage induced in the flowing fluid as the fluid passes through a region having a pulsed magnetic field directed transverse to a direction of fluid flow for a selected duration, said differential voltage being induced across the fluid in a direction transverse to the direction of the magnetic field and to the direction of the fluid flow, a reference channel for providing a reference voltage indicative of an amplitude of said pulsed magnetic field, a pair of analog-to-digital converters (ADCs) active during at least selected intervals of a measurement cycle that includes at least the duration of said pulsed magnetic field, one said converter being connected to the evaluation channel to receive said differential voltage and the other said converter being connected to the reference channel to receive said reference voltage during said selected intervals of the measurement cycle, said converters producing digitized differential and reference voltages, and a programmable controller having a stable clock for timing said measurement cycle, said controller activating said ADCs concurrently during said selected intervals of the measurement cycle and receiving said digital differential and reference voltages to calculate said flow velocity.

3. The electrical circuit of claim 1, further comprising a pair of electrodes spaced apart transverse to said flow direction and to said magnetic field for producing electrical signals indicative of said voltage differential induced across the flowing fluid.

4. The electrical circuit of claim 3, wherein said evaluation channel includes first and second integrating amplifiers each connected to one of said electrodes to amplify said electrical signals produced by said electrodes.

5. The electrical circuit of claim 4, wherein said evaluation channel further includes a differential amplifier receiving output signals of said first and second integrating amplifiers to provide the voltage differential.

6. The electrical circuit of claim 5, wherein said evaluation channel includes a third integrating amplifier receiving said voltage differential to produce an amplified voltage differential, said one said ADC receiving said amplified voltage differential during said selected active intervals.

7. The electrical circuit of claim 6, wherein said evaluation channel includes a referencing circuit for imposing a referencing voltage at an output of said third integrating amplifier at the beginning of said measurement cycle.

8. The electrical circuit of claim 7, wherein said referencing circuit is configured such that said referencing voltage is substantially zero.

9. The electrical circuit of claim 8, wherein said referencing circuit includes a summer receiving said voltage differential at a first input and being connected at an output to an input of said third integrating amplifier, said referencing circuit further including an integrating circuit connected between the output of said third integrating amplifier and a second input of said summer.

10. The electrical circuit of claim 9, wherein said integrating circuit includes an operational amplifier connected in parallel with a capacitor, and a resistor connected in series with a combination of said operational amplifier an said capacitor.

11. The electrical circuit of claim 2, wherein said reference channel includes a current sensor connected to said coil for measuring the current through the coil.

12. The electrical circuit of claim 11, wherein said reference channel further includes an integrating amplifier connected to said current sensor to provide said reference voltage indicative of the current through the coil.

13. The electrical circuit of claim 2, further comprising a display unit connected to said controller for displaying the flow velocity of the fluid.

14. The electrical circuit of claim 2, further including a keypad connected to said programmable controller for programming said controller.

15. The electrical circuit of claim 1, wherein the coil excitor and the current regulator further include:

a four-diode bridge circuit connected in series with one side of the coil, and an integrated three-terminal regulator connected across the two terminals of the four-diode bridge circuit that are not connected to one or more of the coil, the first and second transistors, and the first and second diodes.

16. The electrical circuit of claim 15, wherein the integrated three-terminal regulator includes an external adjustment resistor.

* * * * *